(12) United States Patent
Kowalczyk

(10) Patent No.: US 7,604,241 B2
(45) Date of Patent: Oct. 20, 2009

(54) SEALS FOR TURBINES AND TURBO MACHINERY

(75) Inventor: Mark William Kowalczyk, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/231,879

(22) Filed: Sep. 22, 2005

(65) Prior Publication Data

US 2007/0063448 A1  Mar. 22, 2007

(51) Int. Cl.
*F16J 15/44* (2006.01)
(52) U.S. Cl. ..................................... 277/355
(58) Field of Classification Search ................. 277/355
See application file for complete search history.

(56) References Cited

U.S. PATENT DOCUMENTS

| | | | |
|---|---|---|---|
| 5,106,104 A | 4/1992 | Atkinson et al. | |
| 5,201,530 A * | 4/1993 | Kelch et al. | 277/355 |
| 5,474,306 A | 12/1995 | Bagepalli et al. | |
| 5,480,165 A * | 1/1996 | Flower | 277/355 |
| 5,568,931 A * | 10/1996 | Tseng et al. | 277/355 |
| 5,704,760 A * | 1/1998 | Bouchard et al. | 415/170.1 |
| 5,749,584 A | 5/1998 | Skinner et al. | |
| 6,010,132 A | 1/2000 | Bagepalli | |
| 6,027,121 A | 2/2000 | Cromer et al. | |
| 6,042,119 A | 3/2000 | Bagepalli et al. | |
| 6,045,134 A | 4/2000 | Turnquist et al. | |
| 6,105,967 A | 8/2000 | Turnquist et al. | |
| 6,131,910 A | 10/2000 | Bagepalli et al. | |
| 6,131,911 A | 10/2000 | Cromer et al. | |
| 6,139,018 A | 10/2000 | Cromer et al. | |
| 6,168,162 B1 | 1/2001 | Reluzco et al. | |
| 6,173,958 B1 | 1/2001 | Dinc et al. | |
| 6,250,640 B1 | 6/2001 | Wolfe et al. | |
| 6,257,586 B1 | 7/2001 | Skinner | |
| 6,290,232 B1 | 9/2001 | Reluzco | |
| 6,308,957 B1 * | 10/2001 | Wright | 277/355 |
| 6,331,006 B1 | 12/2001 | Baily et al. | |
| 6,390,476 B1 | 5/2002 | Tong et al. | |
| 6,431,827 B1 | 8/2002 | Wolfe et al. | |
| 6,435,513 B2 | 8/2002 | Skinner | |
| 6,464,230 B1 | 10/2002 | Tong et al. | |
| 6,527,274 B2 | 3/2003 | Herron et al. | |
| 6,550,777 B2 | 4/2003 | Turnquist et al. | |
| 6,589,012 B2 | 7/2003 | Burnett et al. | |
| 6,619,669 B2 | 9/2003 | Zhuo et al. | |
| 6,648,334 B2 * | 11/2003 | Inoue | 277/355 |
| 6,669,203 B1 | 12/2003 | Mortzheim | |
| 6,669,443 B2 | 12/2003 | Burnett et al. | |
| 6,790,001 B2 | 9/2004 | Turnquist et al. | |
| 6,805,356 B2 * | 10/2004 | Inoue | 277/355 |
| 6,827,350 B2 | 12/2004 | Walcott et al. | |

* cited by examiner

*Primary Examiner*—Vishal Patel
(74) *Attorney, Agent, or Firm*—Nixon & Vanderhye, P.C.

(57) ABSTRACT

The seal between high and low pressure regions in a turbine or turbo-machinery includes arcuate segments having a brush seal flanked on one or both sides by a plurality of beams lying adjacent to and in contact with one another. Shims separate the bristles of the brush seal from the rows of beams. The cross sectional dimension of the beams is 20-60 times the diameter of the bristles. The beams terminate short of the rotary component while the bristle tips engage the rotary component. The beams take up most of the pressure difference while the bristles take up the balance of the pressure difference across the seal.

10 Claims, 3 Drawing Sheets

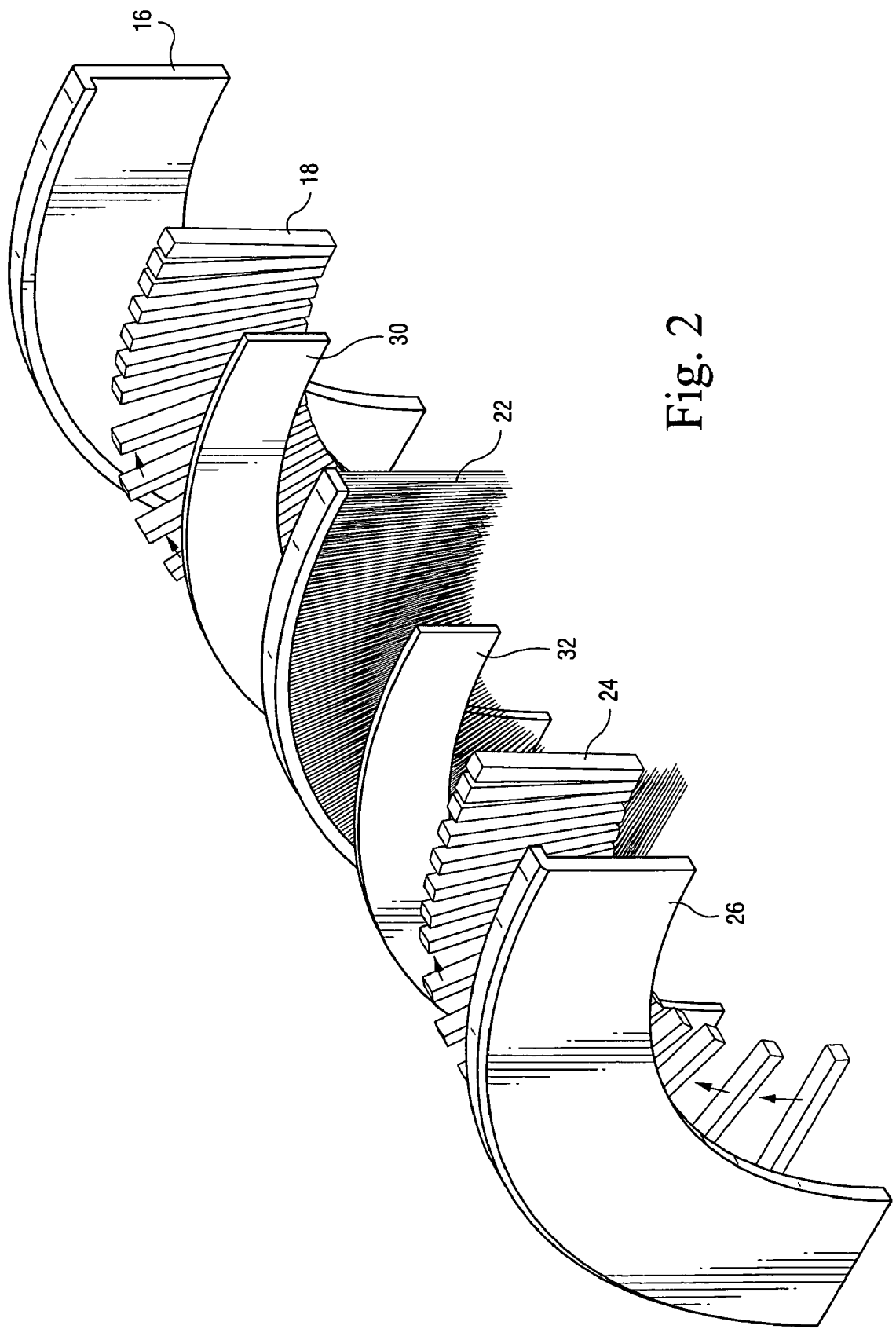

SEALS FOR TURBINES AND TURBO MACHINERY

BACKGROUND OF THE INVENTION

The present invention relates to seals in turbines and turbo-machinery for sealing between stationary and rotary components and particularly relates to a combination of a brush seal and flexible beams for enhanced sealing capability Current state-of-the art seals for turbines and turbo-machinery include brush seals and leaf seals. The construction of both are very complex and labor intensive, hence driving cost. For example, the individual bristles of brush seals are not modular. Rather, they are laid in by hand to form a bristle pack at a certain diameter. Specialized tooling is also required for brush seals of different diameters. This becomes a particular problem where brush seals are used in steam turbines which have a substantial number of stages e.g., 40-50 stages of different diameters and even additional and varying diameters depending upon seal location. Thus a very large number of differently sized seals would be required at substantial cost. Certain of these problems in brush seals have been addressed e.g. by offering brush seals in flexible strips in an effort to avoid tooling issues. However, such seals are often limited in their pressure drop capacity. Accordingly there is a need for seals between stationary and rotary components in turbines and turbo-machinery affording a modular seal construction with little or no dependency on diameter specific tooling, enhanced pressure capabilities and stiffness over conventional brush seals and the elimination of diameter specific tooling in most cases.

BRIEF SUMMARY OF A PREFERRED EMBODIMENT

In a preferred embodiment of the present invention, there is provided a pressure seal for a flow path comprising: a pair of plates spaced from and extending generally parallel to one another and extending in spaced generally parallel planes; a brush seal between the plates extending in a plane between and generally parallel to planes containing the plates and including a plurality of bristles having tips extending beyond margins of the plates; and a first set of a plurality of beams stacked one against the other between one of the plates and the brush seal, the beams extending beyond the margins of the plates and in a plane generally parallel to the planes containing the plates and the brush seal and terminating short of the bristle tips.

In a further preferred embodiment of the present invention, there is provided a pressure seal in a flow path comprising a pair of plates spaced from one another carried by a stationary component and extending toward a rotary component; a brush seal between the plates carried by the stationary component and including a plurality of bristles extending generally toward and for engagement with the rotary component; and a first set of a plurality of beams stacked one against the other in the circumferential direction of the pressure seal and carried by the stationary component between one of the plates and the bristles, the beams extending generally toward and terminating short of the rotary component.

BRIEF DESCRIPTION OF THE DRAWINGS

FIG. 2 is an exploded perspective view of the seal illustrated in FIG. 1; and

DETAILED DESCRIPTION OF A PREFERRED EMBODIMENT

Figure 1:
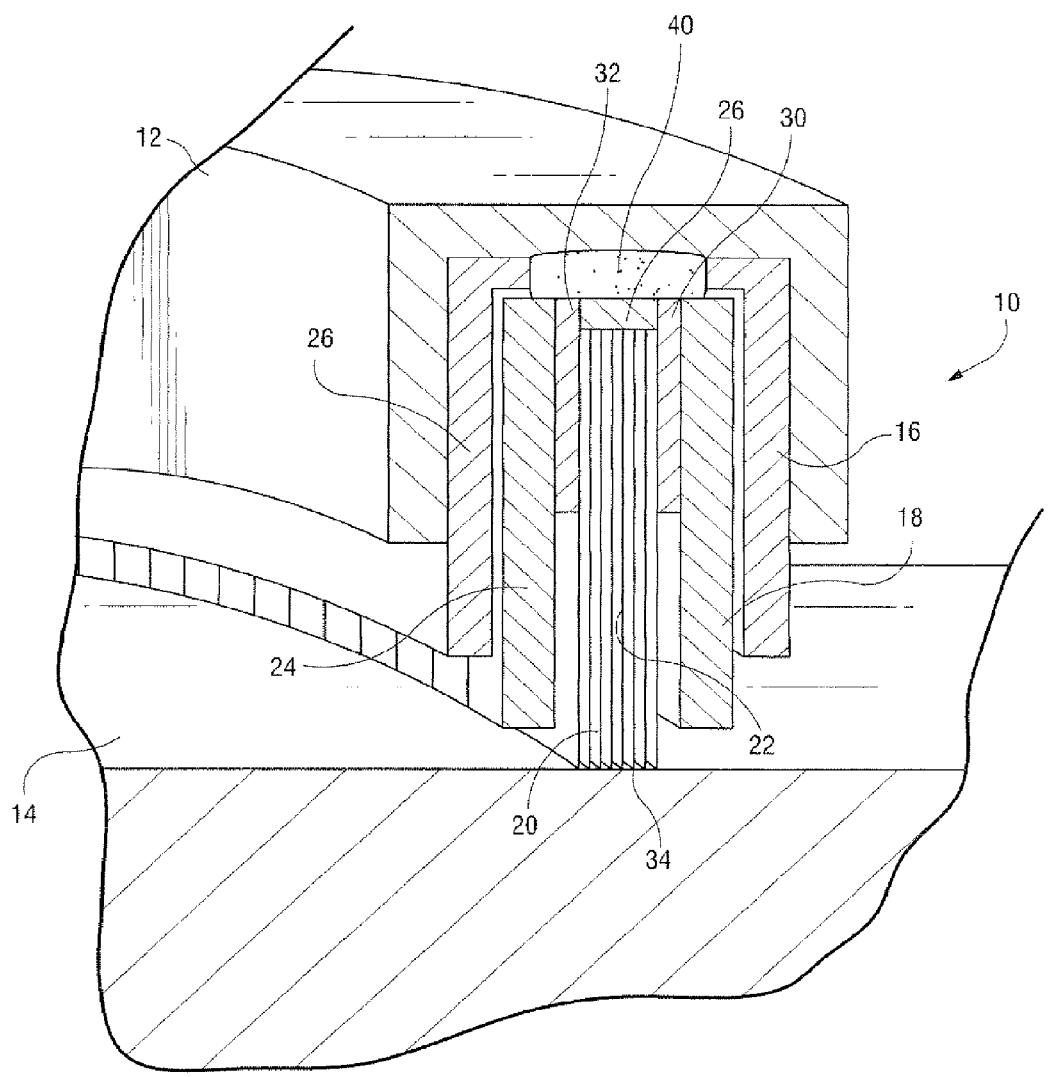
FIG. 1 is a fragmentary perspective view with parts broken out and in cross section of a modular seal constructed in accordance with a preferred aspect of the present invention.

Referring to the drawings particularly to FIG. 1, there is illustrated a seal generally designated 10 constructed in accordance with an aspect of the present invention and extending between a stationary component 12 and a rotary component 14 e.g. in turbines or turbo-machinery. Thus, the stationary component may comprise a portion of a diaphragm mounting the seal 10 for sealing against a rotor 14. The seal 10 may be formed in annular segments for example segments extending about 60° about the axis of the rotor 14 to form a generally annulus about the rotor. Alternatively, the seal 10 may be formed in semi-circular segments or any other number of segments or even in a full circle if desired.

Figure 1A:
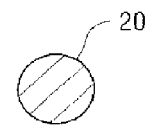
FIG. 1(a) is a cross-section of a brush bristle taken from FIG. 1.

The seal 10 includes a fence or front plate 16, for example on the high pressure side of the seal, a first set of a plurality of beams 18 described below, a plurality of bristles 20 forming a bristle pack 22, a second set of beams 24 on the downstream side of the seal and a back plate 26. Shims 30 and 32 are interposed between the first set of beams 18 and the bristles 22 and the bristles 22 and the second set of beams 24, respectively. The individual bristles 20 forming the bristle pack 22 may be formed in a conventional manner with proximal ends of the bristles secured to a plate or a weldment 26. The individual bristles are typically 5 mils or less in diameter (see the round cross-sectional shape in FIG. 1A) and project from the weldment or plate 26 at an angle to the direction of rotation of the rotor 14. That is, the bristles extend at an acute angle relative to a radii of the rotor extending through the proximal ends of the bristles, the angle opening in the direction of rotation of the rotor 15. The tips 34 at the distal ends of the bristles engage against the surface of the rotary component 14.

The first and second sets of beams 18 and 24 respectively are formed substantially identically to one another and a description of one set constitutes a description of the other set. The beams are preferably formed to have a rectilinear or square cross section. As illustrated in FIG. 2, the plurality of beams of each set are stacked one against the other in the circumferential direction as indicated by the arrows. Consequently, the lateral surfaces of the beams lie in substantial contact with one another particularly towards the distal ends of the beams. The beams may be tapered from proximal to distal ends to ensure face to face circumferential contact. However, tapered beams are not necessary since the space between the beams as a result of the curvature of the segment and the preferred constant rectilinear cross section of the beams throughout their lengths does not substantially adversely affect the pressure carrying capability of the beams. Moreover, by forming the beams of constant rectilinear or square cross sections throughout their length, the ability to fabricate the seal to different diameters at low cost is not compromised.

Figure 3:
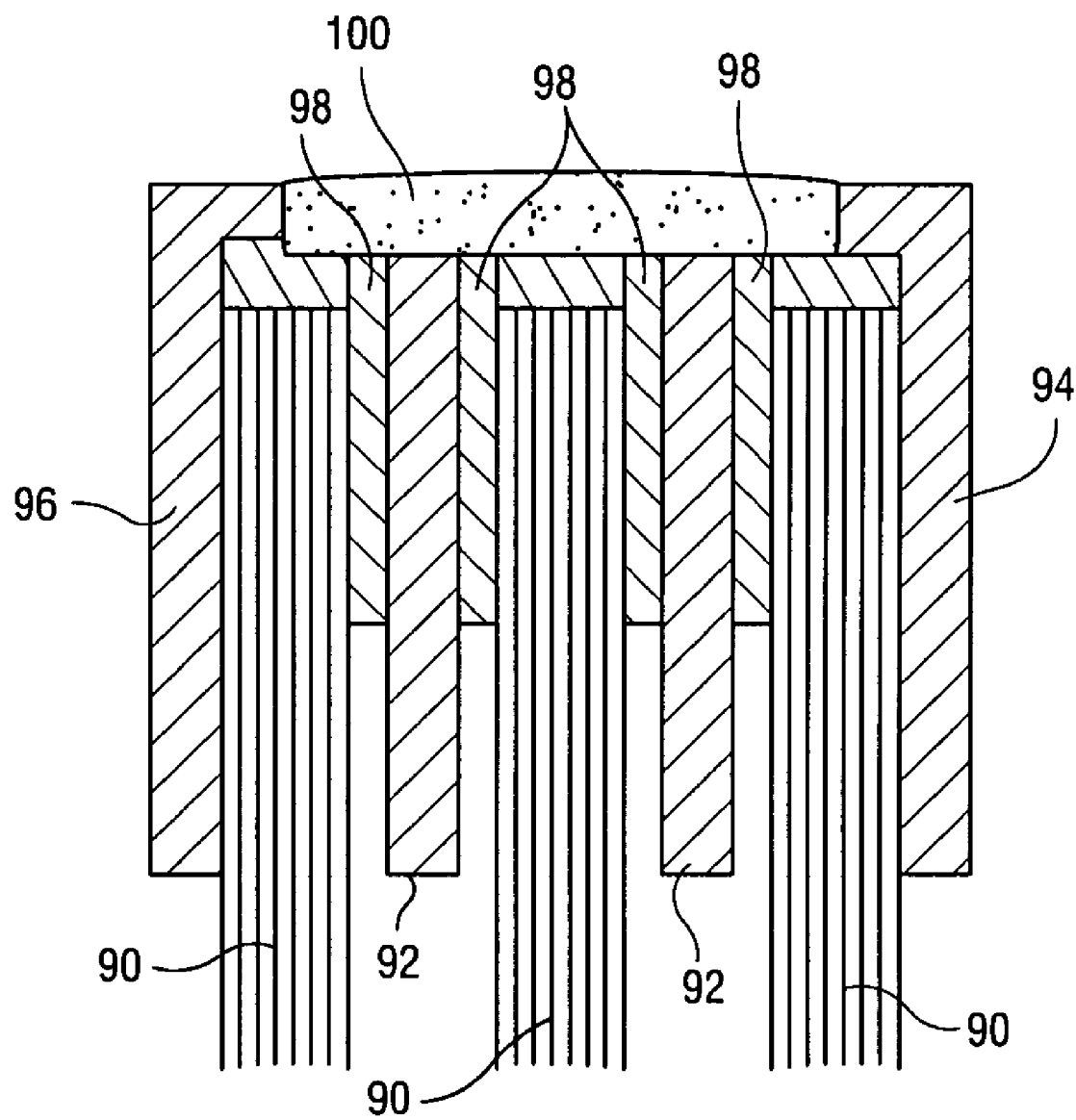
FIG. 3 is a cross-sectional view of the seal.

The beams 18 and 24 may extend from their proximal ends to their distal ends at angles corresponding to the angle of the bristles at each circumferential location or they may extend at greater or lesser angles relative to the bristles and at different angles relative to one another. The distal ends of the beams also terminate short of the surface of the rotary component as illustrated in FIGS. 1 and 3, thereby precluding contact with the rotary component during startup or shutdown of the turbine i.e. during rotary excursions. The maximum dimension in cross section of the beams i.e. a width or depth dimension should lie in a range of 15-60 times the diameter of the bristles and should preferably be about 20 times. The beams are preferably formed of a metal alloy, for example Haynes 25 alloy. The beams are also spaced from the bristles by the shims 30 and 32. However, the beams have a degree of flexibility considerably less than the flexibility of the bristles 20 of the bristle pack 22. That is, the beams are more structurally stiff in the flow direction than the bristles 20 but have a considerably lesser degree of flexibility. It will be appreciated that the shims 30 and 32 provide partial support for the bristles of the bristle pack. The bristle pack, shims and sets of beams may be welded one to the other and to the front and back plates as indicated by the weld 40 in FIG. 1.

It will also be appreciated that the front fence 16 and back plate 26 may be formed in strips i.e., plates which are not machined. Thus, the front fence 16 and back plate 26 may be readily and inexpensively formed to varying diameters as necessary and desired. The assembly of the front fence, back plate, beams, shims and bristle pack may be readily formed to varying diameters by a bending operation without special tooling for each diameter. Further, the beams, while flexible, provide a certain stiffness which enables the beams to take up most of the pressure difference across the seal. The bristles of the bristle pack provide the necessary flexibility for rotor stability as well as a fine sealing capability. The spaces between adjacent beams as well as the spaces between the distal ends of the beams and the surface of the rotor provide a bypass flow about the beams whereby most of the pressure drop is taken up by the beams and the remaining pressure drop is taken up by the bristles.

Referring to FIG. 3, there is illustrated a further form of seal including multiple brush bristles 90 and two sets of beams each containing a plurality of beams 92. As in the prior embodiment, the seal includes a front fence or plate 94 and a back fence or plate 96. The brush seals 90 are disposed between the front plate 94 and back plate 96. Between each pair of adjacent brush seals 90, a plurality of beams 92 are arranged in circumferential contact with one another as in the prior embodiment. The sets of beams are separated from the adjacent brush seals 90 by shims 98. The beams 92, brush seals 90 and shims 98 are similar to the corresponding elements previously described and illustrated in FIGS. 1 and 2 and are secured one to the other and with the fence 94 and back plate 96 by a weld 100 along the proximal side of the pressure seal.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure seal for a flow path comprising:
    a pair of plates spaced from and extending generally parallel to one another and extending in spaced generally parallel planes;
    a brush seal between said plates extending in a plane between and generally parallel to planes containing said plates and including a plurality of bristles having round cross-sectional shapes, with tips extending beyond distal ends of the plates;
    a first set of a plurality of beams of square or rectilinear cross section, stacked circumferentially one against the other between one of the plates and said brush seal, such that lateral surfaces of adjacent beams are in substantial contact, and a second set of a plurality of beams stacked circumferentially one against the other between another of the plates and brush seal, said first and second sets of beams extending beyond distal ends of said plates and in a plane generally parallel to the planes containing said plates and said brush seal and terminating short of the bristle tips, wherein said bristles have a flexibility greater than the flexibility of said first and second sets of beams, and wherein each beam of said first and second sets of beams has a cross-sectional dimension in excess of about twenty times the cross-sectional dimension of each bristle.

2. A pressure seal according to claim 1, including a shim between said bristles and said beams.

3. A pressure seal according to claim 1, wherein said bristles, beams and plates are welded to one another adjacent second ends of said plates opposite said distal ends.

4. A pressure seal according to claim 1, in combination with a stationary component and a rotary component, said plates, brush seal and beams forming part of an arcuate segment about an axis of the rotary component, said bristles and said beams extending from the stationary component at acute angles relative to radii about the axis and opening in the direction of rotation of the rotary component.

5. A pressure seal according to claim 1, wherein the pressure drop along the flowpath across the beams is greater than the pressure drop across the bristles.

6. A pressure seal in a flow path comprising:
    a pair of plates spaced from one another carried by a stationary component and extending toward a rotary component;
    a brush seal between said plates carried by said stationary component and including a plurality of bristles having round cross-sectional shapes and extending generally toward and for engagement with the rotary component;
    a first set of a plurality of beams stacked one against the other in a circumferential direction of the pressure seal and carried by the stationary component between one of the plates and said bristles, said beams lying in a plane, with lateral surfaces of adjacent beams in substantial contact, and a second set of a plurality of beams stacked one against the other in one circumferential direction of the pressure seal and carried by the stationary component between another of the plates and the bristles, said beams of first and second sets of beams extending generally toward and terminating short of the rotary component, wherein said bristles have a flexibility greater than the flexibility of the beams, and wherein each beam of said first and second sets of beams has a cross-sectional dimension in excess of about twenty times the cross-sectional dimension of each bristle; and
    wherein the beams have generally rectilinear cross sections enabling the beams to be stacked side-by-side relative to one another and with flat sides thereof in contact with flat sides of adjacent beams.

7. A pressure seal according to claim 6, including a shim between said bristles and said beams.

8. A pressure seal according to claim 6, wherein said bristles, beams and plates are welded to one another adjacent the stationary component.

9. A pressure seal according to claim 6, wherein said plates, brush seal and beams form part of an arcuate segment about an axis of the rotary component, said bristles and said beams extending from the stationary component at acute angles relative to radii about the axis and opening in the direction of rotation of the rotary component.

10. pressure seal according to claim 6, wherein the pressure drop across the beams is greater than the pressure drop across the bristles.

* * * * *